(12) United States Patent
Lee et al.

(10) Patent No.: US 7,655,277 B2
(45) Date of Patent: Feb. 2, 2010

(54) TITANIA COMPOSITE MEMBRANE FOR WATER/ALCOHOL SEPARATION, AND PREPARATION THEREOF

(75) Inventors: Kew-Ho Lee, Daejeon (KR); Yoon-Kyu Lee, Daejeon (KR); Dong-Wook Lee, Daegu (KR); Bong-Kuk Sea, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 705 days.

(21) Appl. No.: 10/570,827

(22) PCT Filed: Sep. 3, 2004

(86) PCT No.: PCT/KR2004/002238

§ 371 (c)(1),
(2), (4) Date: Mar. 6, 2006

(87) PCT Pub. No.: WO2005/023403

PCT Pub. Date: Mar. 17, 2005

(65) Prior Publication Data

US 2007/0059514 A1    Mar. 15, 2007

(30) Foreign Application Priority Data

Sep. 4, 2003 (KR) .................... 10-2003-0061810

(51) Int. Cl.
B05D 3/02 (2006.01)

(52) U.S. Cl. .................... 427/376.2; 427/245; 427/340; 210/500.21; 210/490; 210/473; 428/319.3; 428/315.5

(58) Field of Classification Search ............... 427/376.2; 210/500.2, 500.21; 421/5.3; 428/319.3; 423/610

See application file for complete search history.

(56) References Cited

U.S. PATENT DOCUMENTS 4,520,044 A * 5/1985 Sundet ........................ 427/244
4,929,406 A 5/1990 Abe et al.
5,160,352 A 11/1992 Najjar et al.
5,208,190 A * 5/1993 Anderson et al. ............. 501/12
5,269,926 A * 12/1993 Webster et al. ......... 210/500.25
5,468,699 A * 11/1995 Zhang et al. ................... 502/60

FOREIGN PATENT DOCUMENTS

| JP | 59-179112 | 10/1984 |
|---|---|---|
| JP | 01-119324 | 5/1989 |
| KR | 10-2004-0031177 | 4/2004 |

OTHER PUBLICATIONS

Qunyin Xu and Marc A. Anderson, "Sol-Gel Route to Synthesis of Microporous Ceramic Membranes: Preparation and Characterization of Microporous $TiO_2$ and $ZrO_2$ Xerogels", *J. Am. Ceram. Soc.* 77 (71 pp. 1939-1945) (1994).

(Continued)

*Primary Examiner*—Shamim Ahmed
*Assistant Examiner*—Maki Angadi
(74) *Attorney, Agent, or Firm*—Frommer Lawrence & Haug LLP; Ronald R. Santucci

(57) ABSTRACT

The present invention relates to a titania composite membrane for separating water/alcohol mixtures and a method of preparation thereof, and more particularly to the titania composite membrane and the method of preparation thereof, wherein a surface of a porous support is modified with silica xerogel and γ-alumina sol and titania sol is coated on the modified surface to form a titania surface layer and then the obtained titania surface layer is dried and calcined to optimize performance of separation and promote thermal stability.

The titania composite membrane of the present invention has excellent properties such as thermal stability, mechanical strength and good perm-selectivity for water molecule in water/alcohol mixtures due to the hydrophilic property of the titania surface layer, thus being applicable to the membrane for separating water/alcohol mixtures.

11 Claims, 2 Drawing Sheets

OTHER PUBLICATIONS

V. T. Zaspalis, W. Van Praag, K. Keizer, J.R.H. Ross, A.J. Burggraaf; "Synthesis and characterization of primary alumina, titania and binary membranes", *Journal of Materials Science* 27 (1992) (pp. 1023-1035).

Katsuki Kusakabe. Kiyotaka Ichiki, Jun-ichiro Hayashi, Hideaki Maeda, Shigeharu Morooka; "Preparation and characterization of silica-polyimide composite membrances coated on porous tubes for $Co_2$ separation", *Journal of Membrane Science* 115 (1996) pp. 65-75.

Brinker and Scherer, "Sol-gel Science", *Academic Press*, 1990, p. 273.

Burggraarf el al.; *Proceedings of the Second International Conference on Inorganic Membrane*, 1991, p. 37.

A.J. Burggraaf, K. Keizer, R.R. Bhaye; "2. Synthesis of Inorganic Membranes" *Synthesis of Inorganic Membranes*, (1991) p. 11.

* cited by examiner

TITANIA COMPOSITE MEMBRANE FOR WATER/ALCOHOL SEPARATION, AND PREPARATION THEREOF

This application is a 371 PCT/KR2004/002238 filed on Sep. 3, 2004, published on Mar. 17, 2005 under publication number WO 2005/023403 A1 which claims priority benefits from South Korean Patent Application Number 10-0061810 filed Sep. 4, 2003.

FIELD OF THE INVENTION

The present invention relates to a titania composite membrane for separating water/alcohol mixtures and a method of preparing the same, and more particularly to a titania composite membrane and a method of preparation thereof, wherein a surface (more exactly macropores) of a porous support is modified with silica xerogel and γ-alumina sol, and titania sol is coated on the modified surface to form a titania surface layer, and then the obtained titania surface layer is dried and calcined to optimize performance of separation and promote thermal stability.

BACKGROUND OF THE INVENTION

The titania composite membrane of the present invention has excellent properties such as thermal stability, mechanical strength and good perm-selectivity for water molecule in water/alcohol mixtures due to the hydrophilic property of the titania surface layer, thus being applicable to a membrane for separating water/alcohol mixtures.

In preparation of water-permeable separation membrane, a pervaporation technique using a polymeric membrane is conventionally used. Compared with other separation and purification techniques, the pervaporation technique using a polymeric membrane has an advantage of low energy consumption, but has a serious limitation in application temperature due to the intrinsic property of polymer. That is, in case of water-permeable membrane prepared by using polymer, there is a problem that application temperature is limited because the polymer chain flows and the membrane becomes unstable at high temperature due to the intrinsic property of polymer. On the other hand, in case of an inorganic membrane where the surface layer is calcined to optimize the performance and then has thermal stability, the limitation of the application temperature may be easily overcome.

Therefore, recent studies have been focused on the use of the inorganic membrane instead of the polymeric membrane. Also, sol-gel process has been explored for preparing inorganic membrane since it requires a simple process and a simple device. To make the inorganic membrane stand comparison with the polymeric membrane, it is required to increase the perm-selectivity performance by preparing the inorganic coating layer having a uniform pore distribution and a high microporosity. It is important to prepare a stable sol with small particle size because the properties of the inorganic coating layer are originated from the properties of a sol that forms the coating layer.

In case of the titania as a material of inorganic membrane, however, it is difficult to control its properties because the reactivity for water is much contrary to silicate [R. R. Bhave, Inorganic membranes: synthesis, Characteristics and Applications; Ch. 2 (1991), Burggraaf et al., Proceedings of the Second International Conference on Inorganic Membrane (1991) p. 37, A. J. Burggraaf et al., J. Mater. Sci., 27 (1992) 1023-1035, M. A. Anderson et al., J. Am. Chem. Soc., 77 (1994) 1939-1945].

Accordingly, for preparing a titania separation membrane by sol-gel method, it is essential to reproducibly prepare the titania sol with excellent property and stability, thereby preparing a thin layer.

The present inventors have conducted extensive studies to prepare the titania separation membrane with thermal stability at high temperature and a good perm-selectivity for water molecule even at high temperature. As a result, they found a fact that thermal stability of the separation membrane can be ensured by sequentially modifying macropores of a porous support with silica xerogel and γ-alumina sol in this order and water can be separated effectively from water/alcohol mixtures due to the excellent hydrophilicity of the titania surface layer by coating the titania sol with small and uniform particles by soaking-rolling method.

Therefore, the object of the present invention is to provide a titania composite membrane for separating water/alcohol mixtures having an excellent thermal stability at high temperature and a method of preparing the same.

DETAILED DESCRIPTION OF THE INVENTION

The present invention relates to a method of preparing a titania composite membrane for separating water/alcohol mixtures, which comprises the steps of (a) modifying macropores of a porous support by sequentially treating the surface with silica xerogel and γ-alumina sol in this order; (b) preparing a titania surface layer by coating the modified surface with titania sol; and (c) drying a membrane with the titania surface at 20-30° C. and relative humidity of 50-70% and then calcining the membrane at 250-400° C.

Also, the present invention relates to a titania composite membrane for separating water/alcohol mixtures according to the present invention, wherein the membrane has a pore size of 1-2 nm, a surface area of 300-350 m²/g, a permeability for water of 25-520 g/m²·h and a selectivity for water of 1-400 in water/alcohol mixtures at 250° C.

The present invention is explained in more detail based on the manufacturing process as set forth below.

The first process is a step of modifying a surface of a porous support with silica xerogel and γ-alumina sol.

As the porous support, a porous metal support (especially porous stainless steel support) having a pore size of 1-5 μm may be used. The present invention is intended to improve thermal stability at high temperature and mechanical strength by modifying the surface of the porous support with silica xerogel and γ-alumina sol before preparing a titania surface layer on the surface of the porous support.

The modification process may comprise a first modification of the surface of the porous support by packing silica xerogel with a press and a second modification of the surface with γ-alumina sol according to a soaking-rolling process.

In the first macropore-modification step, a porous support is modified by packing silica xerogel (80-120 nm) on macropores of the support with press under 100-300 atm and penetrating silica particles into macropores of the support. The support penetrated by silica particles is calcined at 600-700° C. for 1-3 hrs with the heating rate of 1-3° C./min.

In the second macropore-modification step, the pre-modified macropores are re-modified by coating γ-alumina sol according to the soaking-rolling process. Specifically, γ-alumina sol is wetted on the first modified surface and incorporated into the pores of the support by evacuation thereafter. Then, the sol solution is coated by rolling with a rubber roller. The coated membrane is dried at 20-30° C. and relative humidity of 50-70% for 10-15 hrs, and then calcined at 600-700° C. for 1-3 hrs with the heating rate of 1-3° C./min.

Also, the silica xerogel as the first macropore-modifying agent may be obtained by preparing silica sol according to the conventional synthetic method described in the literature [Brinker and Scherer "Sol-Gel Science" p. 273, Academic Press, 1990] and then removing the solvent by using a rotary evaporator. Further, γ-alumina sol as the second macropore-modifying agent may be obtained according to the synthetic method described in the literature [K. Kusakabe et al., J. Membr. Sci., 115(1996), 65-75].

The second process is a step to coat a titania sol on the modified surface preferably by soaking-rolling method to form a titania surface layer with a high microporosity and excellent hydrophilicity.

At this time, it is important to reproducibly prepare the titania sol with excellent property and stability. After the optimum conditions are determined so that the titania sol may have a uniform nano particle and the titania surface layer with superior properties may be formed, a composite membrane with a good perm-selectivity for water molecule at high temperature may be prepared.

The titania sol is prepared to reflux titanium tetraalkoxide in the mixture of water/alcohol/HCl. Specifically titanium tetraisopropoxide 14.76 mL and ethanol 5 mL are mixed and vigorously stirred at room temperature, and then distilled water 100 mL is added and stirred at room temperature for 30 min. HCl 1.33 mL is added in 90° C. oil bath and stirred for 3 hrs to eliminate alcohol. The reaction mixture is refluxed for 9 hrs and cooled down to room temperature thereafter. The titania sol prepared in the same manner as described above has a small and uniform pore size of 2-5 nm and the composite membrane has a large surface area of micropores. Hence, permeability and separation factor can be improved.

The titania surface layer is prepared by coating the above-mentioned titania sol by soaking-rolling method. Specifically, titania sol is soaked and rolled by evacuation for 1 min, dried at 25° C. and relative humidity of 60% for 24 hrs, and then calcined at 300° C. for 2 hrs with the heating rate of 1° C./min.

Also, it is preferable to use soaking-rolling method as the coating method to modify a surface or prepare the titania surface layer thus ensuring thermal stability. Korean Patent Application No. 10-2002-0060554 filed by the present inventors discloses the soaking-rolling method in detail.

The third process is a step to dry and calcine the obtained titania surface layer to optimize performance and promote thermal stability.

The membrane already coated for forming the titania surface layer is dried at 20-30° C. and relative humidity of 50-70%, and then calcined at 250-300° C. The composite membrane of the present invention is prepared by repeating the above coating-drying-calcining procedure 2-10 times.

FIG. 1 shows the isotherm plot and pore size distribution of the titania composite membrane prepared in the same manner as described above, which were measured by the BET analysis. It can be verified that the membrane has a pore size of 1-2 nm and a surface area of 300-350 $m^2/g$. The composite membrane, so prepared, has a permeability for water of 25-520 $g/m^2 \cdot h$ and a selectivity for water of 10-400 in water/alcohol mixtures at 250° C.

Accordingly, the titania composite membrane of the present invention was verified to be useful as the membrane for separating water/alcohol mixtures.

1: Gas cylinder, 2: Ball valve, 3: Check valve, 4: Syringe pump, 5: Furnace, 6: Permeation cell, 7: Membrane, 8: Temperature controller, 9: Cold trap, 10: Gas chromatography, 11: Vacuum pump

EXAMPLES

The present invention is explained in more detail based on the following Examples but is not limited by these Examples.

Example 1

Preparation of the Composite Membrane (1) Modification of Macropores of a Support A porous stainless steel disk (Mott Metallurgical Co.), which has a thickness of 1 mm and an area of 5 $cm^2$, was modified by packing silica xerogel (80-120 nm) on macropores of a support with press under 200 atm and then calcining for 2 hrs at 600° C.

Then, the macropore-modified support with silica xerogel was modified with γ-alumina sol by soaking-rolling method and dried at 25° C. and relative humidity of 60% for 12 hrs, and then calcined at 600° C. for 2 hrs. The above soaking-rolling, drying and calcining procedure was repeated three times. Time of the above soaking procedure was fixed to be conducted for 3 min.

(2) Preparation of the Composite Membrane

A titania surface a layer was prepared on the modified surface of the porous support. At first, to prepare stable titania sol with nano-sized particle, titanium tetraisopropoxide (TIP) was used as a precursor, and ethanol, distilled water, HCl were added thereto. Specifically, 14.76 mL (0.05 mol) of TIP and 5 mL of ethanol were mixed, vigorously stirred at room temperature for 5 min and then 100 mL of distilled water was added thereto, stirred at room temperature until the mixture was suspended uniformly. 1.33 mL of HCl was added in 90° C. oil bath and stirred for 3 hrs to eliminate the propanol produced by hydration and condensation reaction. Then the reaction mixture was refluxed for 9 hrs, cooled down to room temperature and a stable titania sol was prepared.

The titania sol was aged for 7 days, coated on the modified surface of the support by soaking-rolling method, dried at room temperature, and then calcined at 300° C. The above coating-drying-calcining procedure of a titania sol was repeated five times to prepare a composite membrane.

Figure 1:
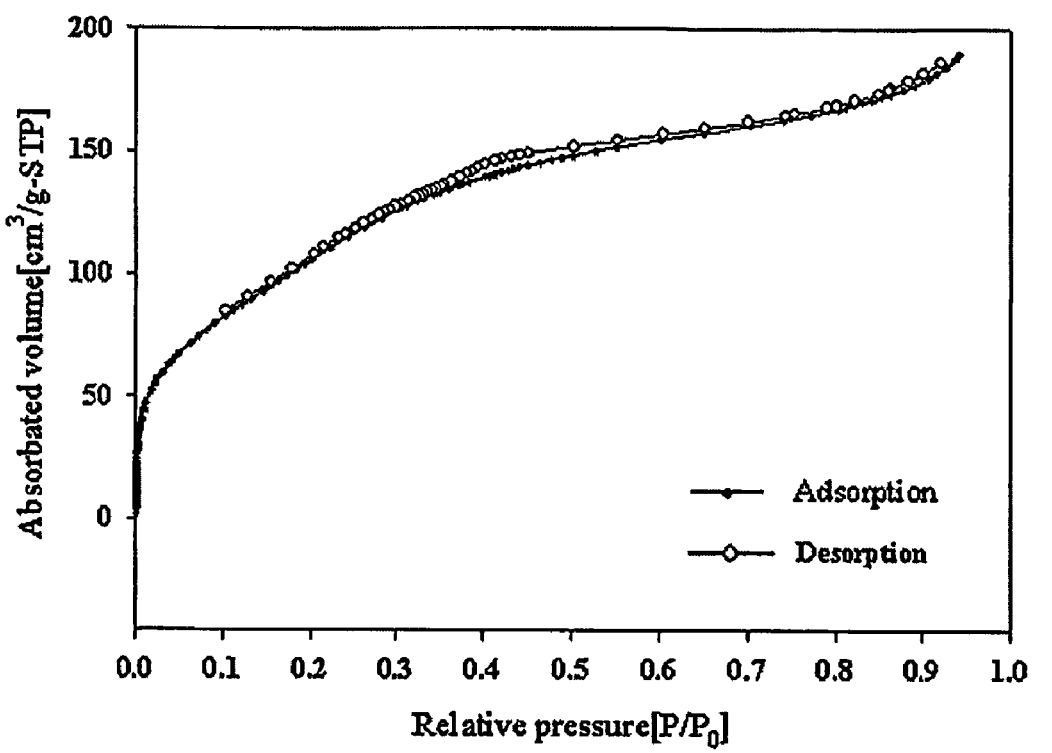
FIG. 1 is a graph showing the isotherm plot and pore size distribution of the titania composite membrane by the BET analysis.
Figure 1:
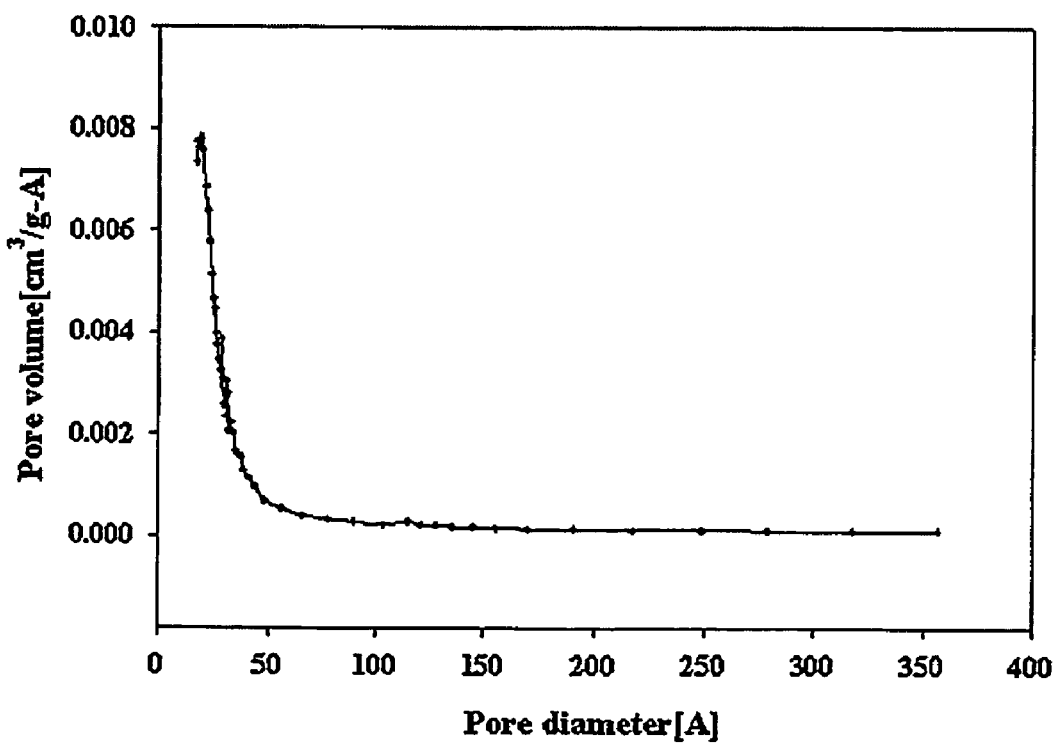

From the titania composite membrane, so prepared, its isotherm plot and pore size distribution were measured by BET analysis, as shown in FIG. 1.

Experimental Example 1

Separation Performance of the Composite Membrane

Figure 2:
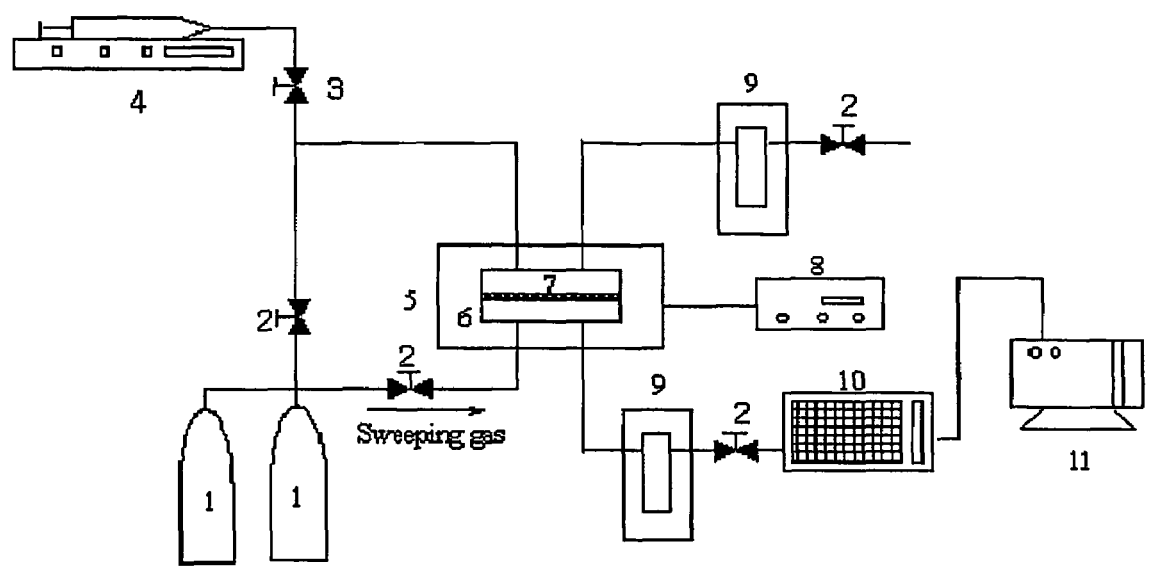
FIG. 2 is a schematic diagram of the vapor permeation apparatus used to measure separation performance for water/alcohol mixtures.

The separation performance of the titania composite membrane, so prepared from Example 1 was measured using the vapor permeation apparatus shown schematically in FIG. 2.

Condition of vapor permeation experiment was as follows. Effective permeation area was 4.52 $cm^2$. Water/alcohol vapor mixtures were fed with argon gas through the upper side of a membrane and the lower side of membrane was evacuated to introduce a driving force.

The permeability of membrane was evaluated by permeation flux ($g/m^2$ h) and the separation factor was calculated using the equation 1.

$$\text{Separation factor } (\alpha) = (y_w/y_o)/(x_w/x_o) \quad \text{Equation 1}$$

wherein x and y are mole fractions of the component in the feed mixture and in the permeate, respectively. Subscripts w and o refer to water and alcohol components, respectively. And the mole fraction was measured using gas chromatography. Permeation rates for water/alcohol mixtures were measured out at 250° C., while changing the composition of water from 10% to 90% to compare the water/alcohol composition dependence of separation performance. The permeability and separation factor results are shown in Tables 1 and 2.

TABLE 1

Separation performance for water/ethanol mixture at permeation temperature of 250° C.

| | Volume ratio of water/ethanol | | | | |
|---|---|---|---|---|---|
| | 10/90 | 30/70 | 50/50 | 70/30 | 90/10 |
| Permeability ($g/m^2 h$) | 25 | 70 | 300 | 385 | 417 |
| Separation factor ($\alpha$) | 12 | 30 | 97 | 138 | ∞ |

TABLE 2

Separation performance for water/propanol mixture at permeation temperature of 250° C.

| | Volume ratio of water/propanol | | | | |
|---|---|---|---|---|---|
| | 10/90 | 30/70 | 50/50 | 70/30 | 90/10 |
| Permeability ($g/m^2 h$) | 49 | 115 | 370 | 452 | 518 |
| Separation factor ($\alpha$) | 34 | 150 | 380 | ∞ | ∞ |

According to the present invention, it was revealed that the titania composite membrane can be prepared by modifying the macropores of the porous support with silica xerogel and γ-alumina sol, coating the modified surface with titania sol by soaking-rolling method and had excellent thermal stability. Also, there can be prepared an excellent separation membrane with a good perm-selectivity for water molecule even at high temperature of 250° C. due to the hydrophilic property of the titania surface layer.

As described above, the titania composite membrane of the present invention has superior thermal stability, a wide range of applicable temperature for water-permeable separation membrane, and shows superior separation performance when compared to the conventional polymeric membrane.

What is claimed is:

1. A method of preparing a titania composite membrane for separating water/alcohol mixtures, the method comprising the steps of:

(a) modifying macropores of a porous support by sequentially treating the macropores with silica xerogel and γ-alumina sol in this order;
    (b) forming a titania surface layer according to a sol-gel process by coating said modified porous surface with titania sol; and
    (c) drying said membrane at 20-30° C. and relative humidity of 50-70% followed by calcining said membrane at 250-400° C.

wherein said membrane has a pore size of 1-2 nm, a surface area of 300-350 $m^2/g$, a permeagility for water of 25-520 $g/m^2$-h and a selectivity for water of 1-400 in water/alcohol mixtures at 250° C.

2. The method of claim 1, wherein said porous support is a porous metal support having a pore size of 1-5 μm.

3. The method of claim 1, wherein the step (a) comprises a first modification of the macropores of said porous support by packing silica xerogel with a press and a second modification of the surface with γ-alumina sol according to a soaking-rolling process.

4. The method of claim 1, wherein said titania sol is prepared by refluxing titanium tetraalkoxide in a mixture of water, alcohol and hydrochloric acid.

5. The method of claim 1, wherein the step (b) is performed by coating the modified surface with titania sol according to a soaking-rolling process.

6. The membrane of claim 1, wherein said permeability for water is 25-420 $g/m^2$-h and said selectivity for water is 10-140 in water/ethanol mixtures at 250° C.

7. The membrane of claim 1, wherein said permeability for water is 50-520 $g/m^2$-h and said selectivity for water of 30-400 in water/propanol mixtures at 250° C.

8. The titania composite membrane for separating water/alcohol mixtures prepared according to claim 2, wherein said membrane has a pore size of 1-2 nm, a surface area of 300-350 $m^2/g$, a permeability for water of 25-520 $g/m^2$-h and a selectivity for water of 1-400 in water/alcohol mixtures at 250° C.

9. The titania composite membrane for separating water/alcohol mixtures prepared according to claim 3, wherein said membrane has a pore size of 1-2 nm, a surface area of 300-350 $m^2/g$, a permeability for water of 25-520 $g/m^2$-h and a selectivity for water of 1-400 in water/alcohol mixtures at 250° C.

10. The titania composite membrane for separating water/alcohol mixtures prepared according to claim 4, wherein said membrane has a pore size of 1-2 nm, a surface area of 300-350 $m^2/g$, a permeability for water of 25-520 $g/m^2$-h and a selectivity for water of 1-400 in water/alcohol mixtures at 250° C.

11. The titania composite membrane for separating water/alcohol mixtures prepared according to claim 5, wherein said membrane has a pore size of 1-2 nm, a surface area of 300-350 $m^2/g$, a permeability for water of 25-520 $g/m^2$-h and a selectivity for water of 1-400 in water/alcohol mixtures at 250° C.

* * * * *